(12) United States Patent
Pascal (10) Patent No.: US 12,006,892 B2
(45) Date of Patent: Jun. 11, 2024

(54) THRUST REVERSER COMPRISING DOORS FORMING AN UPWARD AIR DEFLECTION OPENING IN THE OPEN POSITION

(71) Applicant: SAFRAN NACELLES, Gonfreville-l'Orcher (FR)

(72) Inventor: Sebastien Laurent Marie Pascal, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/790,661

(22) PCT Filed: Dec. 18, 2020

(86) PCT No.: PCT/FR2020/052543
§ 371 (c)(1),
(2) Date: Jul. 1, 2022

(87) PCT Pub. No.: WO2021/136898
PCT Pub. Date: Jul. 8, 2021

(65) Prior Publication Data
US 2023/0067232 A1   Mar. 2, 2023

(30) Foreign Application Priority Data

Jan. 2, 2020   (FR) ...................................... 2000005

(51) Int. Cl.
*F02K 1/62*   (2006.01)
(52) U.S. Cl.
CPC .......... *F02K 1/62* (2013.01); *F05D 2220/323* (2013.01)
(58) Field of Classification Search
CPC ..... F02K 1/62; F02K 1/60; F02K 1/70; F05D 2220/323; B29C 45/0013; B29C 45/0053;
(Continued)

(56) References Cited

U.S. PATENT DOCUMENTS

| 5,779,192 A | 7/1998 | Metezeau et al. |
| 6,256,979 B1 * | 7/2001 | Fournier .................... F02K 1/60 244/110 B |

(Continued)

FOREIGN PATENT DOCUMENTS

| EP | 0 715 068 A1 | 6/1996 |
| FR | 2 764 000 A1 | 12/1998 |
| WO | WO-2021136898 A1 * | 7/2021 | ............... F02K 1/60 |

OTHER PUBLICATIONS

International Search Report dated Apr. 7, 2021 in PCT/FR2020/052543 filed Dec. 18, 2020, 2 pages.

(Continued)

*Primary Examiner* — Craig Kim
(74) *Attorney, Agent, or Firm* — Oblon, McClelland, Maier & Neustadt, L.L.P.

(57) ABSTRACT

A thrust reverser for an aircraft propulsion assembly, this reverser including a lower door and an upper door defining, in thrust reversal configuration, a deflection opening, through which a portion of the fluid not serving to produce the thrust reversal of the aircraft can exit the reverser downstream. The downstream edge of the lower door is offset towards the rear with respect to the downstream edge of the upper door so as to orient the fluid flow passing through the deflection opening vertically upwards. When the propulsion assembly is mounted at the rear portion of the fuselage of the aircraft, this makes it possible in particular to improve the supply of the control surface of the aircraft in the landing phase, in particular in crosswind conditions.

12 Claims, 4 Drawing Sheets

(58) Field of Classification Search
CPC .......... B29C 45/14065; B29C 45/1418; B29C 45/14631; B29C 45/14786; B29C 65/70; B29C 70/16; B29C 70/443
See application file for complete search history.

(56) References Cited

U.S. PATENT DOCUMENTS

| | | | | |
|---|---|---|---|---|
| 7,735,778 | B2* | 6/2010 | Lair | F02K 1/60 |
| | | | | 239/265.29 |
| 8,002,217 | B2* | 8/2011 | Sternberger | F02K 1/70 |
| | | | | 239/265.29 |
| 8,015,797 | B2* | 9/2011 | Lair | F02K 1/60 |
| | | | | 244/110 B |
| 8,052,085 | B2* | 11/2011 | Lair | F02K 1/60 |
| | | | | 239/265.29 |
| 11,187,187 | B2* | 11/2021 | Gormley | F02K 1/763 |
| 2008/0072570 | A1 | 3/2008 | Lair | |
| 2019/0162135 | A1 | 5/2019 | Channell | |
| 2023/0067232 | A1* | 3/2023 | Pascal | F02K 1/62 |
| 2023/0103118 | A1* | 3/2023 | Brochard | B29B 11/06 |
| | | | | 239/265.33 |

OTHER PUBLICATIONS

Preliminary French Search Report dated Sep. 1, 2020 in French Patent Application No. 2000005, 2 pages (with Translation of Category of Cited Documents).

\* cited by examiner

THRUST REVERSER COMPRISING DOORS FORMING AN UPWARD AIR DEFLECTION OPENING IN THE OPEN POSITION

TECHNICAL FIELD

The invention relates to the field of thrust reversers for aircraft propulsion assembly nacelle, and more specifically to the field of door reversers.

In a non-limiting manner, the invention is of particular interest when such a reverser equips a propulsion assembly mounted in the vicinity of a tail, that is to say generally in the rear portion of the fuselage of an aircraft.

PRIOR ART

Figure 1:
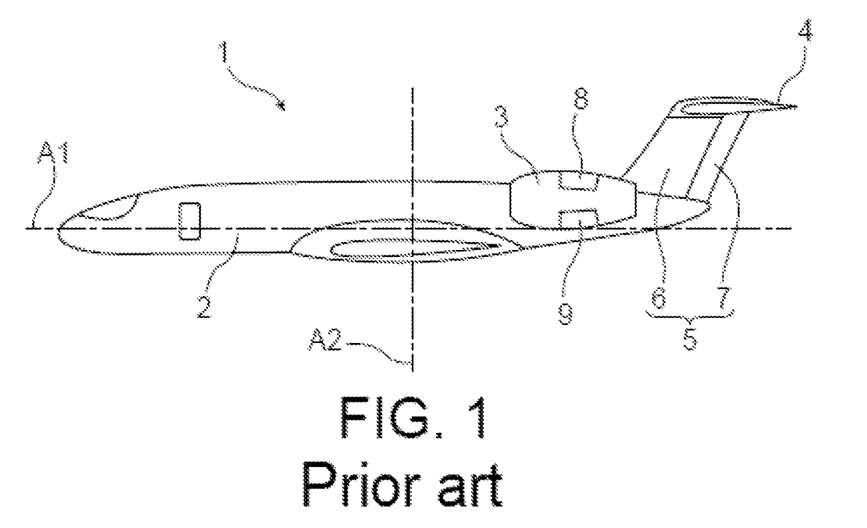
FIG. 1 is a schematic view, already described above, of an aircraft of the prior art, this aircraft comprising propulsion assemblies each equipped with a door thrust reverser.

FIG. 1 shows a conventional business aircraft 1 extending along a longitudinal axis A1. This aircraft 1 comprises a fuselage 2, two propulsion assemblies 3 mounted in the rear portion of the fuselage 2 (only one propulsion assembly being visible in FIG. 1), a horizontal tail 4 and a vertical tail 5. The vertical tail 5 comprises a fixed portion 6, also called tailfin, and a movable portion 7, also called rudder or control surface. The tailfin 6 is intended to stabilise the aircraft 1 around a yaw axis A2, in particular in order to keep the longitudinal axis A1 parallel to the axis of the runway during the landing phase in the event of a crosswind (see below). The control surface 7 is intended to control the moment of the aircraft 1 around the yaw axis A2, in particular to be able to maintain the longitudinal axis A1 parallel to the axis of the runway during the landing phase.

Each of the propulsion assemblies 3 comprises a thrust reverser having an upper door 8 and a lower door 9. In FIG. 1, the propulsion assemblies 3 are in a direct thrust configuration wherein the doors 8 and 9 are closed so as to close respective reversal openings (not shown in this figure).

Figure 2:
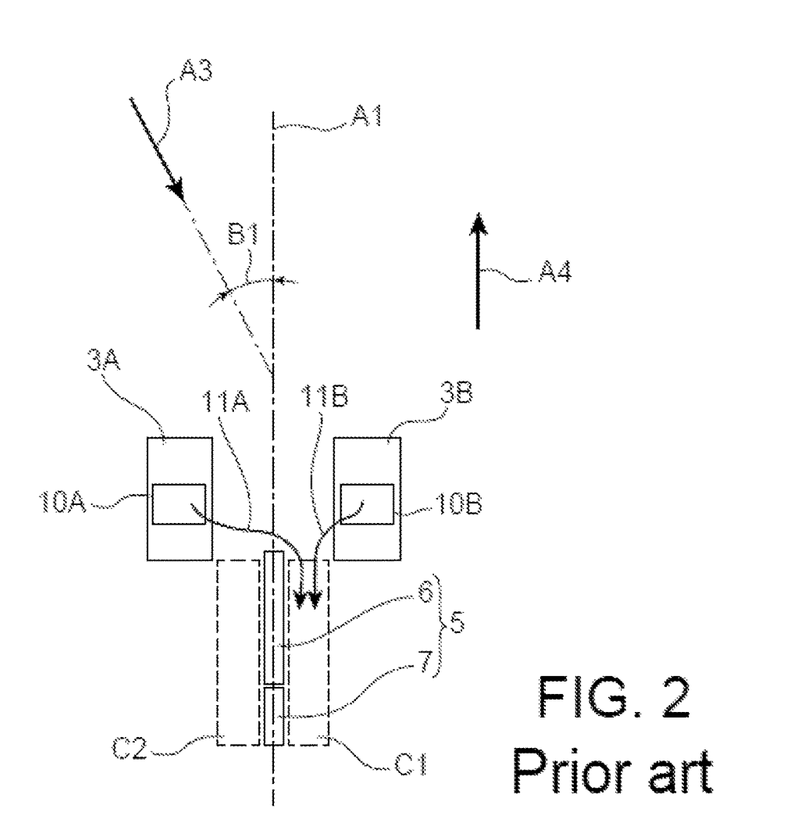
FIG. 2 is a schematic view, already described above, of portions of the aircraft of FIG. 1 in the crosswind landing phase, the reversers being in a thrust reversal configuration.

FIG. 2 schematically shows the two propulsion assemblies (respectively referenced 3A and 3B) as well as the vertical tail 5 with respect to said longitudinal axis A1 and to a relative wind A3. The relative wind A3 is the wind generated by the sum of the displacement of the aircraft 1 and the wind. In FIG. 2, the propulsion assemblies 3A and 3B are in a thrust reversal configuration wherein said doors (not shown in this figure) are open so as to release the corresponding reversal openings, namely an upper reversal opening 10A associated with the upper door of the reverser of the propulsion assembly 3A and an upper reversal opening 10B associated with the upper door of the reverser of the propulsion assembly 3B.

In a manner known per se, the doors of the propulsion assemblies 3A and 3B in thrust reversal configuration are configured to redirect in an upstream direction A4 portion of the air exiting the propulsion assemblies 3A and 3B through the reversal openings 10A/10B.

FIG. 2 illustrates a crosswind landing situation, causing the aircraft 1 to move around the yaw axis A2 so that its longitudinal axis A1 forms an angle B1 with the relative wind direction A3.

Under these conditions, the vertical tail 5 is likely to be subjected to asymmetric air currents, taking into account in particular the respective trajectories of the air flows exiting the propulsion assemblies 3A and 3B through the upper reversal openings 10A and 10B.

Indeed, a portion of the air exiting the propulsion assembly 3B, through the upper reversal opening 10B, typically flows along a trajectory 11B passing through a region C1 extending along one of the faces of the vertical tail 5 located on the side of this propulsion assembly 3B. A portion of the air exiting the propulsion assembly 3A, through the upper reversal opening 10A, typically flows along a trajectory 11A bypassing the tailfin 6 and also crossing the region C1. On the side of the propulsion assembly 3A, a region C2 extending along the other face of the vertical tail 5 thus finds itself undersupplied with air.

The lack of air supply to the tailfin 6 at the region C2 leads to a loss of stability of the aircraft 1.

In addition, the control surface 7 thus emptied of wind at the region C2 has a reduced effectiveness likely to lead to a loss of controllability of the aircraft 1 and potentially a runway excursion.

DISCLOSURE OF THE INVENTION

A purpose of the invention is to provide a door reverser capable of improving the stability and controllability of an aircraft when the doors are open in the landing phase, in particular in crosswinds.

More generally, the invention aims at providing a door reverser making it possible to better control the air flows resulting from the opening of the doors.

To this end, the object of the invention is a thrust reverser for an aircraft propulsion assembly, this reverser having a central longitudinal axis and comprising a fixed structure, a lower door and an upper door, the lower door and the upper door each comprising a downstream edge and each being movable with respect to the fixed structure, around a respective axis of rotation, between:

a closed position wherein the lower and upper doors delimit with the fixed structure a flow conduit, the flow conduit comprising an ejection outlet delimited at least partly by a rear end of the fixed structure, the lower and upper doors in the closed position being configured to be able to guide a fluid flowing in the conduit to its ejection outlet in order to generate a thrust, and an open position wherein the lower and upper doors each release a reversal opening so as to be able to evacuate from the flow conduit a first portion of said fluid, via these reversal openings, and redirect at least a fraction of the fluid thus evacuated towards a front end of the fixed structure in order to generate counter-thrust, the downstream edge of the lower door and the downstream edge of the upper door defining, when the lower and upper doors are in the open position, a deflection opening configured to allow a second portion of said fluid to exit the reverser through this deflection opening.

According to the invention, when the lower and upper doors are in the open position:

a midpoint of the downstream edge of the lower door is offset along the central longitudinal axis towards the rear by a first distance with respect to a midpoint of the downstream edge of the upper door, these midpoints intersecting a median longitudinal plane perpendicular to said axis of rotation of the lower and upper doors, said midpoint of the downstream edge of the lower door is offset in a vertical direction, with respect to said midpoint of the downstream edge of the upper door, towards a distal end of the lower door by a second distance, the vertical direction being perpendicular to the central longitudinal axis and to the axis of rotation of the lower and upper doors, the ratio of said second distance and said first distance is comprised between 0.2 and 2.

When the reverser is in thrust reversal configuration, such an offset of the downstream edges allows said second portion of fluid to be oriented axially downstream and vertically upwards, at least in a reference system wherein the lower door and its downstream edge are located vertically below a median longitudinal plane passing through the central longitudinal axis of the reverser and wherein the upper door and its downstream edge are located vertically above this median longitudinal plane.

When the reverser equips a propulsion assembly mounted in the rear portion of the fuselage of an aircraft, the deflection opening thus makes it possible to direct this second portion of fluid so as to increase the pressures and speeds near the vertical tail which is typically located vertically above the central longitudinal axis of the reverser.

This results in an increase in the pressurisation of the tailfin and the control surface of this tail and consequently an improvement in the stability and controllability of the aircraft, in particular in crosswinds.

More generally, such a geometry of the deflection opening makes it possible to better control the air flows in thrust reversal configuration.

Preferably, said first distance may be comprised between five percent and thirty percent of a radius of a section of said ejection outlet when the lower and upper doors are in the closed position.

Moreover, it is preferred that the deflection opening has a surface projected onto a projection plane perpendicular to the central longitudinal axis comprised between two percent and ten percent of an ejection surface formed by a section of said ejection outlet when the lower and upper doors are in the closed position.

In one embodiment, the axis of rotation of the lower door can be offset along the central longitudinal axis with respect to the axis of rotation of the upper door.

In one embodiment, each of the lower and upper doors can form with respect to the central longitudinal axis, when said doors are in the open position, an opening angle comprised between 55° and 65°, preferably equal to 60°.

According to a first variant embodiment, the fixed structure may comprise an annular ejection shroud, this ejection shroud comprising a trailing edge forming said rear end of the fixed structure.

Thus, according to this first variant, the ejection outlet can be fully delimited by the rear end of the fixed structure, the trailing edge of which is continuous.

Such a fixed structure makes it possible to improve the performance of the reverser in direct thrust configuration compared with a fixed structure wherein the ejection outlet is delimited partly by the rear end of the fixed structure and partly by the downstream edge of the lower and upper doors.

According to a second variant embodiment, the downstream edge of the lower door and the downstream edge of the upper door can delimit a respective portion of said ejection outlet when the lower and upper doors are in the closed position.

Preferably, the deflection opening may have an ovoid surface, projected onto said projection plane, this ovoid surface being preferably centred on the central longitudinal axis.

The invention also relates to a nacelle for an aircraft propulsion assembly, this nacelle comprising a reverser as described above.

The invention also relates to a propulsion assembly for an aircraft, this propulsion assembly comprising such a nacelle.

Finally, the invention also relates to an aircraft comprising such a propulsion assembly.

In one embodiment, the propulsion assembly can be connected to a fuselage of this aircraft so that, in said vertical direction, said midpoint of the downstream edge of the upper door is located between said midpoint of the downstream edge of the lower door and a vertical tail of this aircraft.

In other words, in this last embodiment, a point constituted by the projection onto said projection plane of the median point of the downstream edge of the upper door is located vertically, that is to say in the vertical direction, between a point formed by the projection onto this projection plane of the midpoint of the downstream edge of the lower door and a point formed by the projection onto this projection plane of at least one point of the vertical tail.

This configuration makes it possible to improve the stability and controllability of the aircraft, in particular in crosswinds, for the reasons set out above.

Other advantages and features of the invention will appear upon reading the detailed, non-limiting description which follows.

BRIEF DESCRIPTION OF THE DRAWINGS

The following detailed description refers to the appended drawings wherein.

DETAILED DESCRIPTION OF EMBODIMENTS

Figure 3:
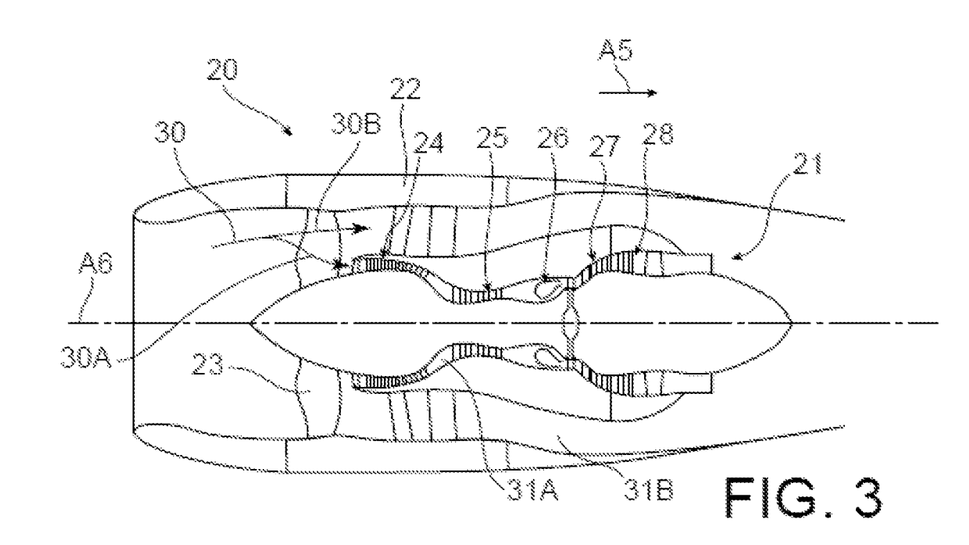
FIG. 3 is a schematic view in axial section of an aircraft propulsion assembly.

FIG. 3 shows a propulsion assembly 20 intended to be mounted on an aircraft such as the aircraft 1 of FIG. 1.

In the present description, the terms "upstream", "downstream", "front" and "rear" are defined with respect to a direction A5 of air flow around the propulsion assembly 20 when the latter generates thrust, that is to say a direction A5 opposite to the direction of movement of the aircraft that it propels.

In a manner known per se, the propulsion assembly 20 comprises a turbomachine 21 shrouded by a nacelle 22. In this example, the turbomachine 21 is a two-spool and bypass turbojet engine.

The turbojet engine 21 has a central longitudinal axis A6 around which its various components extend, in this case, from the front to the rear of the turbojet engine 21, a fan 23, a low pressure compressor 24, a high pressure compressor 25, a combustion chamber 26, a high pressure turbine 27 and a low pressure turbine 28. The compressors 24 and 25, the combustion chamber 26 and the turbines 27 and 28 form a gas generator.

During operation of the turbojet engine 21, an air flow 30 enters the nacelle 22 via an air inlet upstream of the propulsion assembly 20, crosses the fan 23 then divides into a central primary flow 30A and a secondary flow 30B. The primary flow 30A flows in a primary gas flow path 31A passing through the gas generator. The secondary flow 30B flows in a secondary flow path 31B surrounding the gas generator and delimited radially outwards by the nacelle 22.

Figure 4:
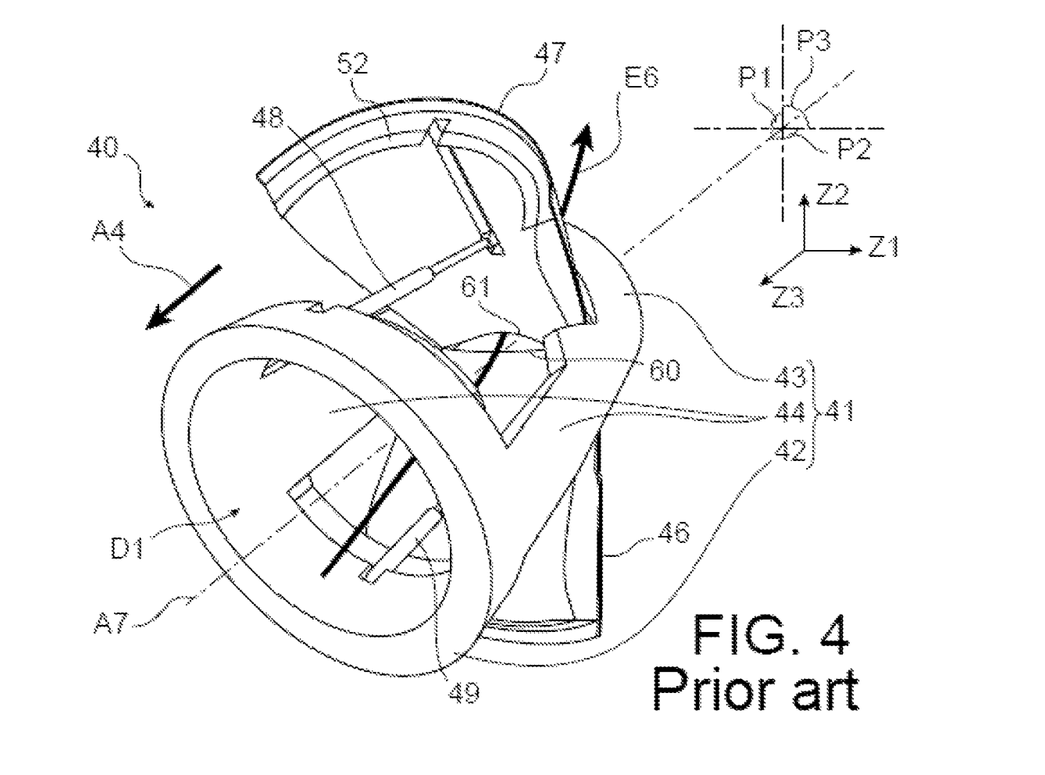
FIG. 4 is a schematic perspective view of a thrust reverser of the prior art, this reverser comprising doors in the open position corresponding to a thrust reversal configuration.

The invention relates more specifically to a door thrust reverser such as the reverser 40 of FIG. 4.

In general, the function of the reverser 40 is to reverse a portion of the thrust generated by the propulsion assembly 20 in order to brake the aircraft during its landing.

Of course, the reverser 40 can equip a propulsion assembly different from that of FIG. 3 without departing from the scope of the invention.

With reference to FIG. 4, the reverser 40 comprises on the one hand a fixed structure 41 extending along a central longitudinal axis A7.

The fixed structure 41 comprises in this example a front frame 42, a rear section 43 and two beams 44 connecting the front frame 42 and the rear section 43 to each other.

The front frame 42 has an annular shape configured to connect the reverser 40 to the nacelle 22, according to any conventional assembly technique.

In this example, the rear section 43 has an annular shape defining an ejection shroud. This ejection shroud 43 defines a rear end of both the reverser 40, the nacelle 22 and the propulsion assembly 20.

When the reverser 40 is mounted on the propulsion assembly 20, the central longitudinal axis A7 of the reverser 40 and the central longitudinal axis A6 of the propulsion assembly 20 coincide.

The front frame 42, the rear section 43 and the beams 44 delimit, radially outwards, a flow conduit D1 for a fluid coming from a portion of the propulsion assembly 20 located upstream of the reverser 40.

More specifically, the fluid capable of flowing in the conduit D1 is in this example made up of a mixture of gas exiting the primary flow path 31A and air coming from the secondary flow path 31B, that is to say of a mixture of the primary 30A and secondary 30B flow paths.

The flow conduit D1 comprises an inlet delimited by the front frame 42 and an ejection outlet delimited by the rear section 43.

In order to be able to perform thrust reversal, the fixed structure 41 comprises in this example two reversal openings in the form of radial openings.

Each of these reversal openings is delimited, longitudinally, by the front frame 42 and the rear section 43 and, radially, by the beams 44.

The reverser 40 of FIG. 4 also comprises a movable structure in the shape of two pivoting doors 46 and 47.

The doors 46 and 47 are respectively called lower door and upper door, with reference to their relative positioning with respect to the vertical when the reverser 40 is connected to an aircraft in flight configuration.

Figure 5:
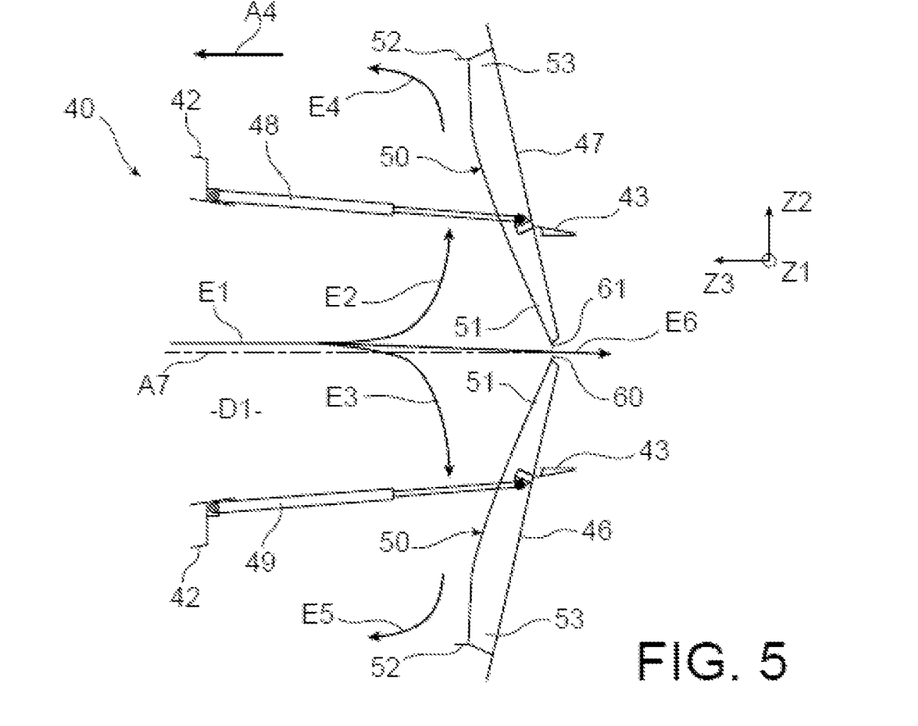
FIG. 5 is a schematic view in axial section of the reverser of FIG. 4, in thrust reversal configuration.
Figure 6:
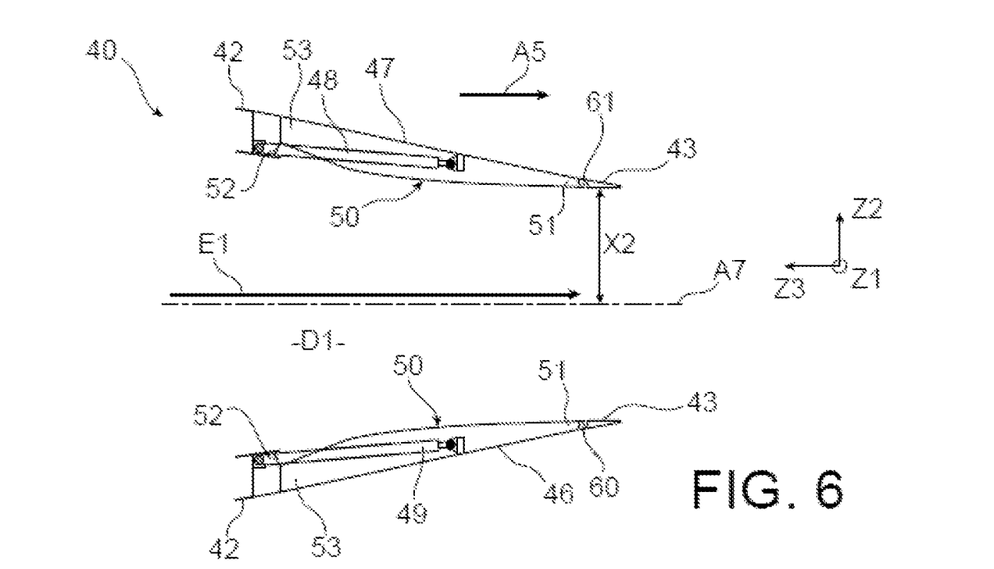
FIG. 6 is a schematic view in axial section of the reverser of FIG. 4, in the direct thrust configuration, the doors being in the closed position.

Each of the doors 46 and 47 is movable with respect to the fixed structure 41, around a respective axis of rotation (not shown), between an open position, illustrated in FIGS. 4 and 5, and a closed position illustrated in FIG. 6.

To modify the position of the doors 46 and 47, the reverser 40 comprises two cylinders 48 and 49 which are each connected on the one hand to the front frame 42 of the fixed structure 41 and on the other hand to a respective one of the doors 46 and 47.

With reference to FIG. 6, wherein the doors 46 and 47 are in the closed position, each of the doors 46 and 47 closes off a respective one of the reversal openings so as to delimit, in continuity with the fixed structure 41, the flow conduit D1.

In the closed position, the doors 46 and 47 make it possible to guide towards the ejection outlet a fluid E1 entering the conduit D1 at the front frame 42 and flowing in the conduit D1 in a direction generally parallel to the central longitudinal axis A7. As indicated above, the fluid flow E1 comprises in this example a mixture of the primary 30A and secondary 30B flows generated by the operation of the turbojet engine 21.

In this configuration of reverser 40 wherein the doors 46 and 47 are in the closed position, the propulsion assembly 20 can generate direct thrust. This configuration of the reverser 40 is called direct thrust, or else "direct jet".

With reference to FIG. 5, wherein the doors 46 and 47 are in the open position, the doors 46 and 47 release the reversal openings of the fixed structure 41.

This open position makes it possible to evacuate from the flow conduit D1, via the reversal openings, portions E2 and E3 of the fluid E1 flowing in the conduit D1. It also makes it possible to redirect at least a portion E4 and E5 of the fluid thus evacuated upstream, that is to say in particular towards the front frame 42 of the fixed structure 41 and more generally towards the front of the propulsion assembly 20 and of the aircraft 1. The fluid thus redirected upstream generates a counter-thrust.

To direct the fluid upstream, the doors 46 and 47 each comprise an internal wall 50 having a proximal end 51 configured to extend radially through the flow conduit D1, so as to prevent a major portion of the fluid E1 flowing in the conduit D1 to continue its trajectory to the ejection outlet. The orientation of the internal wall 50 is such that the fluid E1 thus blocked continues its trajectory by crossing the reversal openings and by having at least one component oriented upstream.

In a manner known per se, it is possible to maximise this component and improve thrust reversal performance by placing a spoiler 52 at a distal end 53 of the internal wall 50 of each of the doors 46 and 47.

When the doors 46 and 47 are in the open position, the reverser 40 is in a configuration called thrust reversal configuration, also called "reverse jet".

In the present description, the expression "open position" designates a position of maximum opening as shown in FIGS. 4 and 5, it being understood that the doors 46 and 47 temporarily occupy intermediate positions during changes in the configuration of the reverser 40.

In the reverser 40 of FIG. 4, a fraction E6 of the fluid can however continue its trajectory towards the ejection outlet when the doors 46 and 47 are in the open position, via a leakage opening delimited by a downstream edge 60 of the lower door 46 and a downstream edge 61 of the upper door 47.

This fraction of fluid E6 typically represents less than ten percent of the total volume of fluid E1 introduced into the conduit D1 and does not significantly reduce the counter-thrust force generated by the flows E4 and E5 (see FIGS. 4 and 5).

FIG. 4 and subsequent comprise a reference frame Z1, Z2 and Z3 respectively defining lateral, vertical and longitudinal directions.

A first median longitudinal plane P1, a second median longitudinal plane P2 and a transverse plane P3 are defined with respect to this reference frame (see FIG. 4). In this example, the median longitudinal plane P1 is a vertical plane parallel to the directions Z2 and Z3 and passing through the central longitudinal axis A7 of the reverser 40 and through the cylinders 48 and 49. The median longitudinal plane P2 is a horizontal plane parallel to the directions Z1 and Z3 which also passes through the central longitudinal axis A7 and which is perpendicular to the vertical plane P1. The transverse plane P3 is a plane perpendicular to the median longitudinal planes P1 and P2 and to the central longitudinal axis A7.

In the reverser 40 of FIG. 4, the doors 46 and 47 are longitudinally aligned with respect to each other and symmetrical with respect to the horizontal plane P2. Thus, in this reverser 40 of the prior art, the downstream edges 60 and 61 are aligned with respect to each other along the central longitudinal axis A7.

In a situation such as that illustrated in FIG. 2, the impact of such a leakage opening has little if any impact on the pressurisation of the tail 5.

Figure 7:
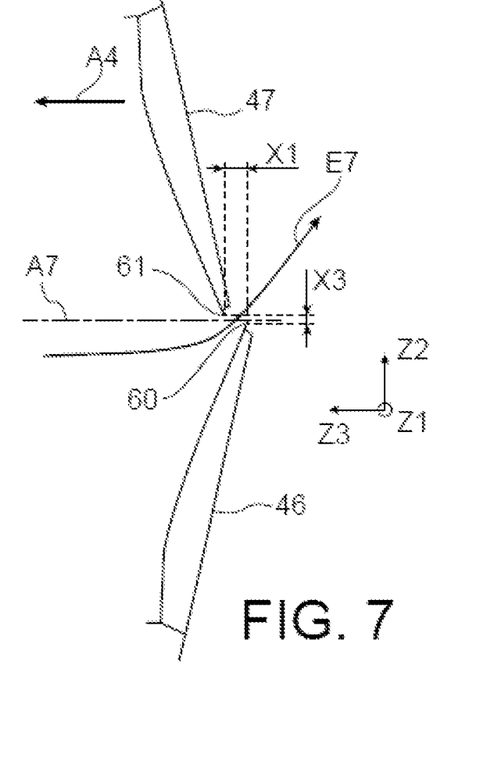
FIG. 7 is a schematic view of the lower and upper doors of a thrust reverser in accordance with the invention.

FIG. 7 shows the doors 46 and 47 in the open position in an arrangement making it possible to overcome the disadvantages set out above with reference to FIG. 2. In what follows, reference is made to a reverser 40 which differs from that of FIG. 4 essentially by the relative arrangement of the doors 46 and 47. The other features of the reverser 40 bear the same reference signs and can therefore be viewed in FIGS. 4 to 6.

In the embodiment of FIG. 7, the downstream edges 60 and 61 define a deflection opening which differs from the leakage opening of the reverser 40 of FIG. 4 in that it allows the fluid E7 exiting the conduit D1 through this deflection opening to be oriented upwards when the doors 46 and 47 are in the open position.

In this example, the deflection opening allows the flow E7 at the outlet of the reverser 40 to be oriented in a direction forming with the horizontal plane P2 an angle of about twenty degrees.

To this end, the downstream edge 60 of the lower door 46 is offset along the central longitudinal axis A7 towards the rear with respect to the downstream edge 61 of the upper door 47 when the doors 46 and 47 are in the open position. This offset concerns at least the midpoints M1 and M2 of the downstream edges 60 and 61 respectively, these points M1 and M2 being called midpoints because they intersect the median longitudinal plane P1 (see FIGS. 8 and 9).

In this example, this offset is obtained by correspondingly offsetting the axes of rotation of the doors 46 and 47 along the central longitudinal axis A7.

Alternatively or additionally, in embodiments not shown, the longitudinal offset of the downstream edges 60 and 61 with respect to each other may result from a differential in the opening angle of the doors 46 and 47, the position of the connection points of the cylinders 48 and 49, or else the stroke of the cylinders 48 and 49.

When the reverser 40 equips a propulsion assembly such as the propulsion assembly 20 of FIG. 3 mounted on an aircraft such as the aircraft 1 of FIG. 1, such an offset of the downstream edges 60 and 61 allows the flow E7 to be oriented longitudinally and vertically towards the vertical tail 5 which is located downstream of the propulsion assembly 20 and vertically above the central longitudinal axis A7 of the reverser 20. This makes it possible to increase the pressurisation of the tailfin 6 and the control surface 7, in particular under the action of the crosswind tending to bring the flow E7 laterally towards the tail 5.

Preferably, the midpoint M1 of the downstream edge 60 and the midpoint M2 of the downstream edge 61 are longitudinally offset from each other, when the doors 46 and 47 are in the open position, by a distance X1 comprised between five percent and thirty percent of an internal radius X2 of the rear section 43 of the fixed structure 41 (see FIGS. 6 and 7).

To obtain satisfactory pressurisation of the tail 5 without significantly reducing the counter-thrust, it is moreover preferred that the deflection opening has a surface, projected onto a projection plane formed by the transverse plane P3, comprised between two percent and ten percent of the internal section of the rear section 43. In this example, this internal section is equal to $\pi(X2)^2$. Concerning the projected surface of the deflection opening, said surface is in particular calculated using the distance X3 separating the midpoints M1 and M2 from each other in the vertical direction Z2.

In this example, the ratio X3/X1 is close to 1, good performance can generally be obtained with a ratio X3/X1 comprised between 0.2 and 2.

Figure 8:
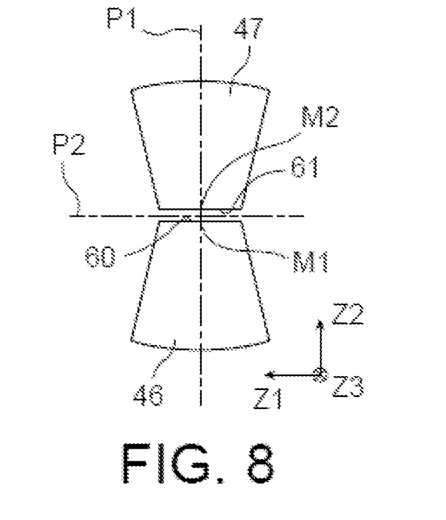
FIG. 8 is a schematic view of the doors of the reverser of FIG. 7, the doors comprising a downstream edge according to a first embodiment of the invention.
Figure 9:
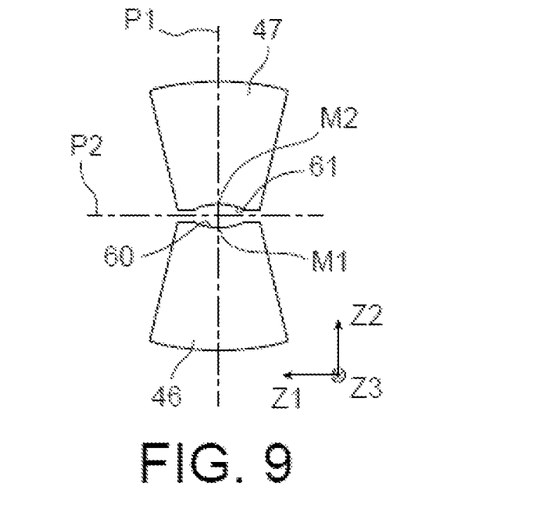
FIG. 9 is a schematic view of the doors of the reverser of FIG. 7, the doors comprising a downstream edge according to a second embodiment of the invention.

The downstream edges 60 and 61 can have different geometries such as those illustrated in FIGS. 8 and 9.

In the example of FIG. 8, the projection onto the projection plane P3 of the downstream edge 60 of the lower door 46 forms a straight line parallel both to the horizontal plane P2 and to the straight line formed by the projection onto the projection plane P3 of the downstream edge 61 of the upper door 47. Thus, for each pair of points of the downstream edges 60 and 61 intersecting a plane parallel to the vertical plane P1, the distance separating these points is identical to the distance X3 separating the midpoints M1 and M2 in the vertical plane P1.

In the example of FIG. 9, the projection onto the projection plane P3 of the downstream edges 60 and 61 forms lines whose distance from one another is greater at the vertical plane P1 than at the lateral ends of these downstream edges 60 and 61 thus projected. In particular, the distance X3 separating the projection onto this projection plane P3 from the midpoints M1 and M2 is greater than the distance separating the projection onto this projection plane P3 from a point of the downstream edge 60 and the projection onto this projection plane P3 from a point of the downstream edge 61 intersecting any other plane parallel to this vertical plane P1.

In this example, the deflection opening has a substantially ovoid shape making it possible to maximise the flow E7 in the vertical median plane P1 of the reverser 40.

The invention is in no way limited to reversers of the type described above. For example, the invention applies similarly to a reverser such as that described in document FR 2 764 000 A1. In this case, the beams on which the doors are hinged comprise a rear end which delimits a portion of the ejection outlet when the doors are in the closed position, the downstream edge of the doors delimiting another portion of the ejection outlet when said doors are in the closed position.

More generally, the principle of the invention can be implemented in any application requiring improved control of the air jets exiting the reverser in reverse thrust. For example, the invention is also of interest in applications wherein the reverser equips a propulsion assembly mounted under an aircraft wing.

The invention claimed is:

1. A thrust reverser for an aircraft propulsion assembly, said reverser having a central longitudinal axis and comprising a fixed structure, a lower door and an upper door, the lower door and the upper door each comprising a downstream edge and each being movable with respect to the fixed structure, around a respective axis of rotation, between:
- a closed position wherein the lower and upper doors delimit with the fixed structure a flow conduit, the flow conduit comprising an ejection outlet delimited at least partly by a rear end of the fixed structure, the lower and upper doors in the closed position being configured to be able to guide a fluid flowing in the conduit to its ejection outlet to generate a thrust, and
- an open position wherein the lower and upper doors each release a reversal opening so as to be able to evacuate from the flow conduit a first portion of said fluid, via these reversal openings, and redirect at least a fraction of the fluid thus evacuated towards a front end of the fixed structure in order to generate counter-thrust,
- the downstream edge of the lower door and the downstream edge of the upper door defining, when the lower and upper doors are in the open position, a deflection opening configured to allow a second portion of said fluid to exit the reverser through said deflection opening, said reverser comprising, when the lower and upper doors are in the open position:
- a midpoint of the downstream edge of the lower door is offset along the central longitudinal axis towards the rear by a first distance with respect to a midpoint of the downstream edge of the upper door, these midpoints intersecting a median longitudinal plane perpendicular to said axis of rotation of the lower and upper doors,
- said midpoint of the downstream edge of the lower door is offset in a vertical direction, with respect to said midpoint of the downstream edge of the upper door, towards a distal end of the lower door by a second distance, such that said midpoint of the downstream edge of the lower door and said midpoint of the downstream edge of the upper door are not overlapping in said vertical direction,
- the vertical direction being perpendicular to the central longitudinal axis and to the axis of rotation of the lower and upper doors,
- the ratio of said second distance and said first distance is comprised between 0.2 and 2.

2. The reverser according to claim 1, wherein said first distance is comprised between five percent and thirty percent of a radius of a section of said ejection outlet when the lower and upper doors are in the closed position.

3. The reverser according to claim 1, wherein the deflection opening has a surface projected onto a projection plane perpendicular to the central longitudinal axis comprised between two percent and ten percent of an ejection surface formed by a section of said ejection outlet when the lower and upper doors are in the closed position.

4. The reverser according to claim 1, wherein the axis of rotation of the lower door is offset along the central longitudinal axis with respect to the axis rotation of the upper door.

5. The reverser according to claim 1, wherein each of the lower and upper doors forms with respect to the central longitudinal axis, when said doors are in the open position, an opening angle comprised between 55° and 65°.

6. The reverser according to claim 1, wherein the fixed structure comprises an annular ejection shroud, said ejection shroud comprising a trailing edge forming said rear end of the fixed structure.

7. The reverser according to claim 1, wherein the downstream edge of the lower door and the downstream edge of the upper door delimit a respective portion of said ejection outlet when the lower and upper doors are in the closed position.

8. The reverser according to claim 1, wherein the deflection opening has an ovoid surface, projected onto a projection plane perpendicular to the central longitudinal axis.

9. The reverser according to claim 1, wherein, in the open position, the midpoint of the downstream edge of the lower door and the midpoint of the downstream edge of the upper door are positioned relative to each other so as to define said deflection opening.

10. The reverser according to claim 9, wherein said deflection opening is configured such that said second portion of said fluid exits deflection opening in an oblique direction relative to a horizontal plane of the thrust reverser.

11. A propulsion assembly for an aircraft, said propulsion assembly comprising a nacelle comprising a thrust reverser having a central longitudinal axis and comprising a fixed structure, a lower door and an upper door, the lower door and the upper door each comprising a downstream edge and each being movable with respect to the fixed structure, around a respective axis of rotation, between:
- a closed position wherein the lower and upper doors delimit with the fixed structure a flow conduit, the flow conduit comprising an ejection outlet delimited at least partly by a rear end of the fixed structure, the lower and upper doors in the closed position being configured to be able to guide a fluid flowing in the conduit to its ejection outlet to generate a thrust, and
- an open position wherein the lower and upper doors each release a reversal opening so as to be able to evacuate from the flow conduit a first portion of said fluid, via these reversal openings, and redirect at least a fraction of the fluid thus evacuated towards a front end of the fixed structure in order to generate counter-thrust,
- the downstream edge of the lower door and the downstream edge of the upper door defining, when the lower and upper doors are in the open position, a deflection opening configured to allow a second portion of said fluid to exit the reverser through said deflection opening, said reverser comprising, when the lower and upper doors are in the open position:
- a midpoint of the downstream edge of the lower door is offset along the central longitudinal axis towards the rear by a first distance with respect to a midpoint of the downstream edge of the upper door, these midpoints intersecting a median longitudinal plane perpendicular to said axis of rotation of the lower and upper doors,
- said midpoint of the downstream edge of the lower door is offset in a vertical direction, with respect to said midpoint of the downstream edge of the upper door, towards a distal end of the lower door by a second distance, such that said midpoint of the downstream edge of the lower door and said midpoint of the downstream edge of the upper door are not overlapping in said vertical direction, the vertical direction being perpendicular to the central longitudinal axis and to the axis of rotation of the lower and upper doors,
- the ratio of said second distance and said first distance is comprised between 0.2 and 2.

12. An aircraft comprising a fuselage, a vertical tail and a propulsion assembly having a nacelle comprising a thrust reverser having a central longitudinal axis and comprising a fixed structure, a lower door and an upper door, the lower door and the upper door each comprising a downstream edge and each being movable with respect to the fixed structure, around a respective axis of rotation, between:

a closed position wherein the lower and upper doors delimit with the fixed structure a flow conduit, the flow conduit comprising an ejection outlet delimited at least partly by a rear end of the fixed structure, the lower and upper doors in the closed position being configured to be able to guide a fluid flowing in the conduit to its ejection outlet to generate a thrust, and an open position wherein the lower and upper doors each release a reversal opening so as to be able to evacuate from the flow conduit a first portion of said fluid, via these reversal openings, and redirect at least a fraction of the fluid thus evacuated towards a front end of the fixed structure in order to generate counter-thrust, the downstream edge of the lower door and the downstream edge of the upper door defining, when the lower and upper doors are in the open position, a deflection opening configured to allow a second portion of said fluid to exit the reverser through said deflection opening, said reverser comprising, when the lower and upper doors are in the open position:

a midpoint of the downstream edge of the lower door is offset along the central longitudinal axis towards the rear by a first distance with respect to a midpoint of the downstream edge of the upper door, these midpoints intersecting a median longitudinal plane perpendicular to said axis of rotation of the lower and upper doors, said midpoint of the downstream edge of the lower door is offset in a vertical direction, with respect to said midpoint of the downstream edge of the upper door, towards a distal end of the lower door by a second distance, such that said midpoint of the downstream edge of the lower door and said midpoint of the downstream edge of the upper door are not overlapping in said vertical direction, the vertical direction being perpendicular to the central longitudinal axis and to the axis of rotation of the lower and upper doors, the ratio of said second distance and said first distance is comprised between 0.2 and 2, wherein the propulsion assembly is connected to the fuselage so that, in said vertical direction, said midpoint of the downstream edge of the upper door is located between said midpoint of the downstream edge of the lower door and the vertical tail.

* * * * *